(12) United States Patent
Zhang

(10) Patent No.: US 10,186,999 B1
(45) Date of Patent: Jan. 22, 2019

(54) VOLTAGE ANGLE CONTROL FOR A PERMANENT MAGNET MACHINE

(71) Applicant: Rockwell Automation Technologies, Inc., Mayfield Heights, OH (US)

(72) Inventor: Zhendong Zhang, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/890,188

(22) Filed: Feb. 6, 2018

(51) Int. Cl.
*H02P 21/00* (2016.01)
*H02P 21/10* (2016.01)

(52) U.S. Cl.
CPC .................................. *H02P 21/10* (2013.01)

(58) Field of Classification Search
CPC ...... H02P 1/00; H02P 1/04; H02P 1/24; H02P 1/26; H02P 1/46; H02P 21/00; H02P 21/0003; H02P 21/0035; H02P 21/0042; H02P 21/0046; H02P 21/06; H02P 21/08; H02P 21/10; H02P 6/00; H02P 6/001; H02P 23/00; H02P 25/00; H02P 27/00; H02P 27/04; H02P 27/06; H02P 3/18

USPC ......... 318/400.01, 400.02, 400.14, 700, 721, 318/799, 800, 801; 363/40, 44, 95, 120

See application file for complete search history.

(56) References Cited

U.S. PATENT DOCUMENTS

| 6,037,741 A * | 3/2000 | Yamada | H02P 6/185 318/254.2 |
| 9,312,799 B2 * | 4/2016 | Kato | H02P 21/0089 |
| 9,590,551 B2 * | 3/2017 | Omata | H02P 21/26 |

* cited by examiner

*Primary Examiner* — Antony M Paul
(74) *Attorney, Agent, or Firm* — Kunzler, PC

(57) ABSTRACT

For flux vector control, a controller generates a control signal for a permanent magnet machine. The controller further generates an output voltage angle as a function of the control signal that regulates the permanent magnet machine. The output voltage angle includes an angular canceling function that cancels an angular control portion of a dynamic response of the permanent magnet machine such that the control signal controls the permanent magnet machine as a second-order quadrant-axis current.

20 Claims, 11 Drawing Sheets

VOLTAGE ANGLE CONTROL FOR A PERMANENT MAGNET MACHINE

BACKGROUND INFORMATION

The subject matter disclosed herein relates to voltage angle control for a permanent magnet machine.

BRIEF DESCRIPTION

A controller for flux vector control is disclosed. The controller includes a control module that generates a control signal for a permanent magnet machine. The controller further includes a canceling function that generates an output voltage angle as a function of the control signal that regulates the permanent magnet machine. The output voltage angle includes an angular canceling function that cancels an angular control portion of a dynamic response of the permanent magnet machine such that the control signal controls the permanent magnet machine as a second-order quadrant-axis current. At least a portion of the canceling function and the control module include one or more of hardware and a processor executing code.

A method for flux vector control is also disclosed. The method generates, by use of a processor, a control signal for a permanent magnet machine. The method further generates with a canceling function an output voltage angle as a function of the control signal that regulates the permanent magnet machine. The output voltage angle includes an angular canceling function that cancels an angular control portion of a dynamic response of the permanent magnet machine such that the control signal controls the permanent magnet machine as a second-order quadrant-axis current.

A system for flux vector control is also disclosed. The system includes a permanent magnet machine, a control module, and a canceling function. The control module generates a control signal for a permanent magnet machine. The canceling function generates an output voltage angle as a function of the control signal that regulates the permanent magnet machine. The output voltage angle includes an angular canceling function that cancels an angular control portion of a dynamic response of the permanent magnet machine such that the control signal M controls the permanent magnet machine as a second-order quadrant-axis current. At least a portion of the canceling function and the control module include one or more of hardware and a processor executing code.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
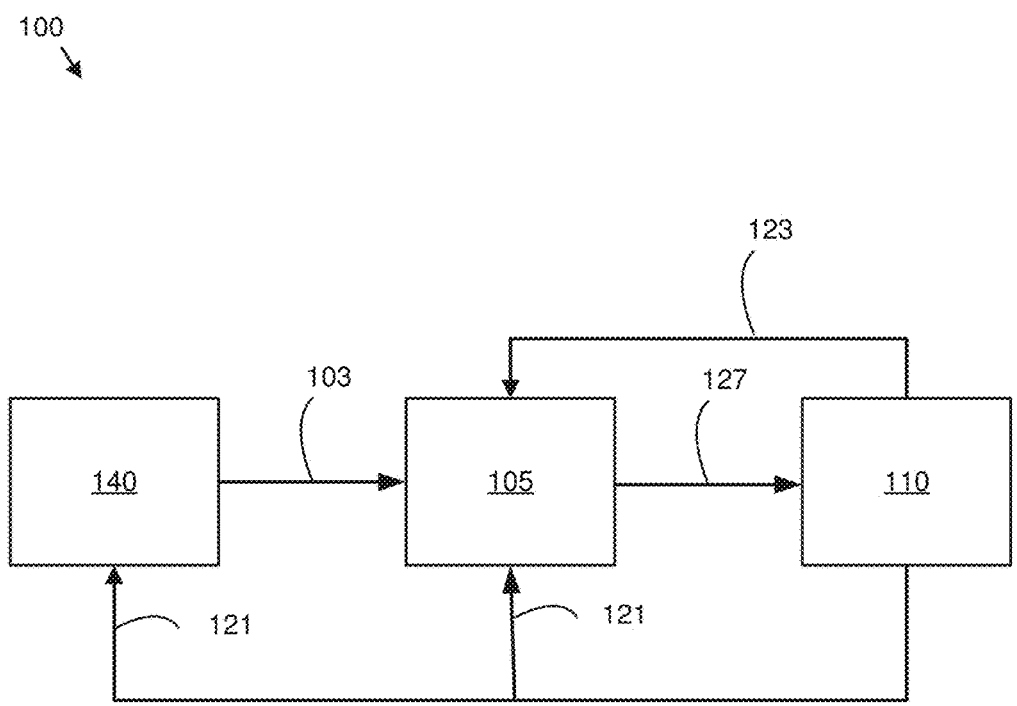
FIG. 1A is a schematic block diagram of a flux vector control system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a flux vector control system 100. The system 100 may control a permanent magnet machine 110 such as a synchronous machine using flux vector control. In the past, direct-axis- (d-axis), quadrant-axis- (q-axis) based current regulation has required a minimum voltage margin, resulting in reduced torque production at high speeds and reduced drive efficiency. This is particularly disadvantageous for permanent magnet machines 110 such as a permanent magnet motor that are driven by a battery. Such permanent magnet machines 110 have often been unable to take advantage of six-step mode operation.

The embodiments described herein employ flux angle control by generating an output voltage angle as will be described hereafter. The output voltage angle includes an angular canceling function that cancels an angular control portion of a dynamic response of the permanent magnet machine 110 so that a control signal controls the permanent magnet machine 110 as a second-order quadrant-axis current. The embodiments further support six-step mode operation. In addition, the embodiments generate predictable dynamic performance.

In the depicted embodiment, the system 100 includes a torque to Iq module 140, a controller 105, and the permanent magnet machine 110. In one embodiment, the permanent magnet machine 110 is a permanent magnet motor. The torque to Iq module 140 generates a q-axis torque current signal 103. The quadrant-axis torque current signal 103 may be generated in part based on a current feedback signal 121 from the permanent magnet machine 110. In one embodiment, the q-axis torque current signal 103 is generated to control the torque of a permanent magnet machine 110.

The controller 105 receives the q-axis torque current signal 103 and generates a drive signal 127 based on the q-axis torque current signal 103, the current feedback signal 121, and a commanded output voltage magnitude 123 from the permanent magnet machine 110. The generation of the signals 103/121/127 by the controller 105 and permanent magnet machine 110 are described in more detail hereafter.

Figure 1B:
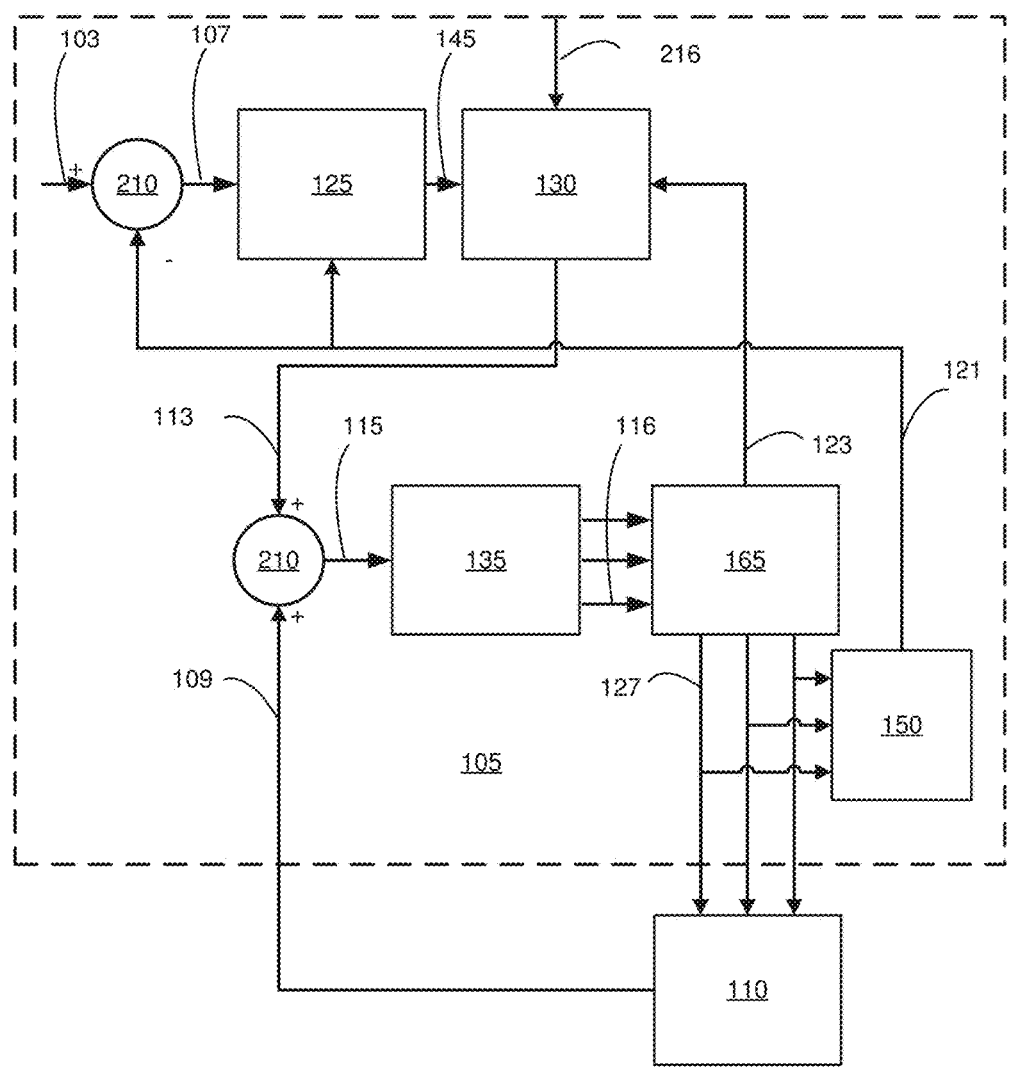
FIG. 1B is a schematic block diagram of a controller according to an embodiment.

FIG. 1B is a schematic block diagram of the controller 105. The controller 105 generates the drive signal 127 in response to the q-axis torque current signal 103 to control the torque of the permanent magnet machine 110. In the depicted embodiment, the controller includes a control module 125, a canceling function 130, one or more summing functions 210, a waveform generator 135, a converter 165, and a DQ Transform 150. The controller 125 and the canceling function 130 may be implemented with hardware elements, a processor, or combinations thereof.

The DQ Transform 150 may sample the drive signal 127 and generate the current feedback signal 121. The drive signal 127 is a three-phase signal. In one embodiment, the drive signal 127 comprises a drive signal phase current $127_I$. The current feedback signal 121 may be a direct-quadrature-zero signal. In one embodiment, the current feedback signal 121 is a vector comprising a d-axis feedback current $I_{daf}$ and a q-axis feedback current $I_{qaf}$.

The current feedback signal 121 is summed by a summing function 210 with the q-axis torque current signal 103 to form a proportional-integral input 107. The controller 125 may generate a control signal M 145 as a transfer function of the q-axis torque current signal 103 and the current feedback signal 121 as will be described hereafter in FIGS. 3A-B. In one embodiment, the controller 125 generates a control signal M 145 as a transfer function of the proportional-integral input 107. The control signal M 145 regulates the permanent magnet machine 110, The canceling function 130 generates the output voltage angle 113 as a function of the control signal M 145, a rotor frequency $\omega_r$ 216 of the permanent magnet machine 110, and the commanded output voltage magnitude 123 from the converter 165. The output voltage angle 113 comprises an angular canceling function that cancels the angular control portion of a dynamic response of the permanent magnet machine 110 such that the control signal M 145 controls the permanent magnet machine 110 as a second-order q-axis current.

The output voltage angle 113 may be combined with a position signal 109 using a summing function 210 to generate an angular control signal 115. The position signal 109 may indicate a position of a rotor in the permanent magnet machine 110. The angular control signal 115 may drive a waveform generator 135. The waveform generator 135 may generate switching signals 116 that drive a converter 165. In one embodiment, the waveform generator 135 generates six-step mode switching signals 116. The converter 165 may generate the drive signal 127 based on the switching signals 116 to drive the permanent magnet machine 110.

Figure 2A:
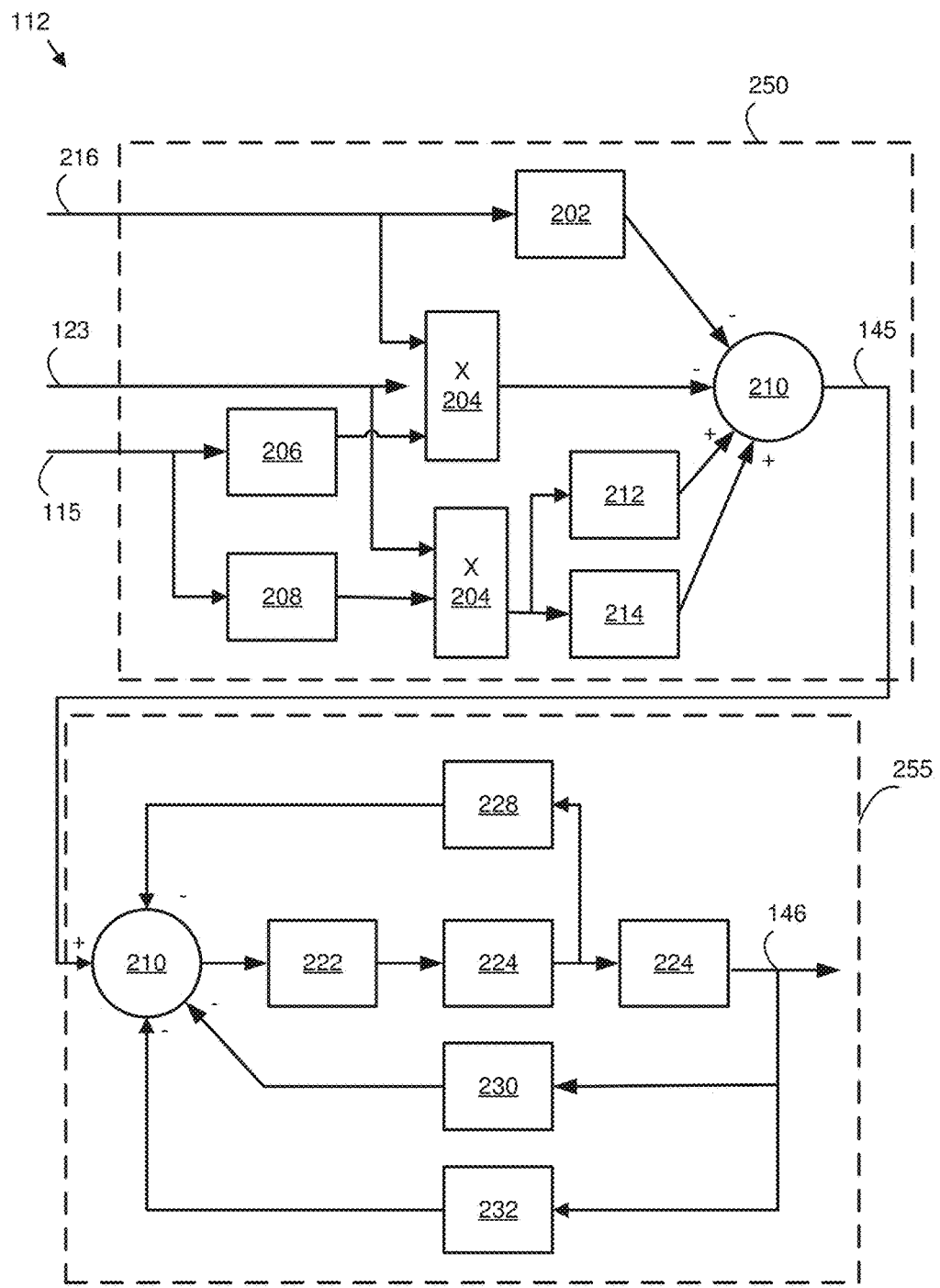
FIG. 2A is a schematic block diagram of a model of a permanent magnet machine according to an embodiment.

FIG. 2A is a schematic block diagram of a model 112 of the permanent magnet machine 110. The model 112 of the permanent magnet machine 110 includes an angular control portion 250 and the second-order q-axis current portion 255. The model 112 of the permanent magnet machine 110 is used to control the permanent magnet machine 110 as a second-order q-axis current 255 by canceling the angular control portion 250 so that the control signal M 145 effectively controls the second-order q-axis current portion 255 of the permanent magnet machine 110.

The model 112 includes a cosine function 206, a sine function 208, one or more summing functions 210, one or more multiplication functions 204, a $$\frac{R_s X \lambda_f}{L_d}$$

function 202, a $$\frac{R_s}{L_d}$$

function 212, a derivative function 214, a $$\frac{1}{L_q}$$

function 222, a $$R_s + R_s \frac{L_q}{L_d}$$

function 228, one or more integral functions 224, a $L_q \omega_r^2$ function 230, and a $$\frac{R_s^2}{L_d}$$

function 232. As used herein, $R_s$ is a stator resistance for the permanent magnet machine 110, $L_d$ is a d-axis inductance for the permanent magnet machine 110, $L_q$ is a q-axis inductance for the permanent magnet machine 110, $\lambda_f$ is a permanent flux linkage for the permanent magnet machine 110, and $\omega_r$ is a rotor frequency 216 for the permanent magnet machine 110.

The model 112 receives the angular control signal 115, the rotor frequency $\omega_r$ 216, and the commanded output voltage magnitude $|v_s|$ 123, and produces a q-axis current 146. The model 112 of the permanent magnet machine 110 allows the canceling function 130 to cancel the angular control portion 250 of the permanent magnet machine 110 so that the control module 125 may directly control the permanent magnet machine 110 as a second-order q-axis current 255.

Figure 2B:
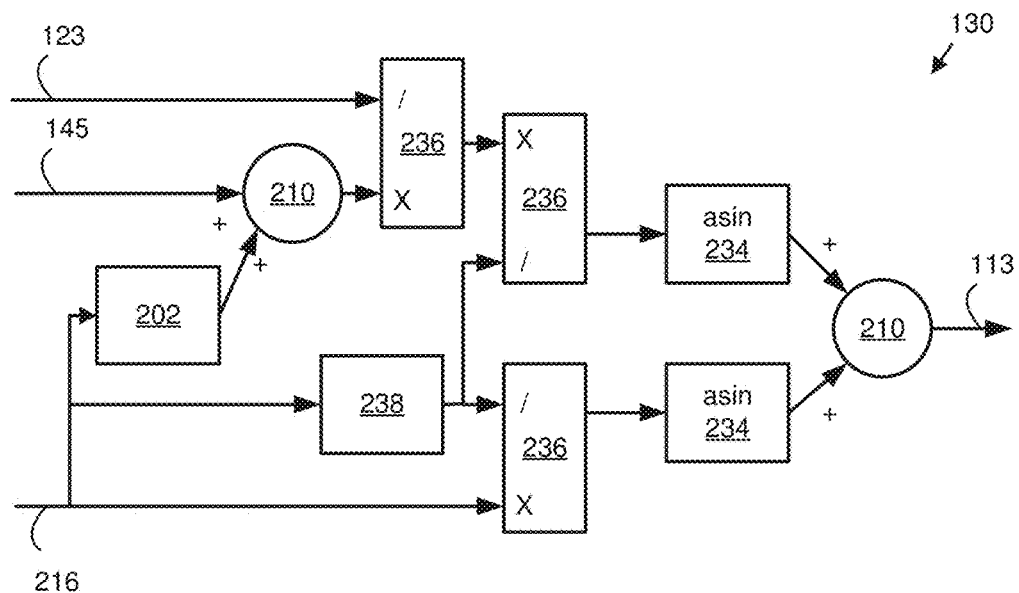
FIG. 2B is a schematic block diagram of a canceling function according to an embodiment.

FIG. 2B is a schematic block diagram of the canceling function 130. In the depicted embodiment, the canceling function 130 includes the $$\frac{R_s X \lambda_f}{L_d}$$

function 202, a $$\sqrt{\left(\frac{R_s}{L_s}\right)^2 + \omega_r^2}$$

function 238, one or more summing functions 210, one or more multiplier/divide functions 236, and one or more arc sin functions 234. The canceling function 130 receives the control signal M 145, the commanded output voltage magnitude 217, the commanded output voltage magnitude $|v_s|$ 123, and the rotor frequency $\omega_r$ 216, and generates the output voltage angle 113.

The canceling function 130 models the control signal M 145 as shown in Equation 1, wherein $\theta_v$ is the output voltage angle 113 in a synchronous reference frame.

$$M = -\omega_r |v_s| \cos\theta_v + \frac{R_s}{L_d} |v_s| \sin\theta_v + |v_s| \cos\theta_v \frac{d\theta_v}{dt} - \frac{R_s}{L_d} \omega_r \lambda_f \quad \text{Equation 1}$$

In one embodiment, the canceling function 130 generates the output voltage angle $\theta_v$ 113 as expressed in Equation 2 by omitting the derivative term in Equation 1.

$$\theta_v = a\sin\left(\frac{M + \frac{R_s \lambda_f \omega_r}{L_d}}{|v_s|\sqrt{\left(\frac{R_s}{L_d}\right)^2 + \omega_r^2}}\right) + a\sin\left(\frac{\omega_r}{\sqrt{\left(\frac{R_s}{L_d}\right)^2 + \omega_r^2}}\right) \quad \text{Equation 2}$$

An angular canceling function of the output voltage angle 113 effectively cancels the angular control portion 250 of the permanent magnet machine 110, as will be described hereafter. As a result, the permanent magnet machine 110 may be controlled by the control signal M 145 as the second-order q-axis current Iq 255, wherein the second-order q-axis current Iq 255 is modeled as shown in Equations 3 and 4.

$$I_q = \frac{1}{L_{qs}s^2 + \left(R_s + R_s\frac{L_q}{L_d}\right)s + \left(\frac{R_s^2}{L_d} + \omega_r^2 L_{qs}\right)}$$ Equation 3

$$I_q = \frac{\frac{1}{L_q}}{L_{qs}s^2 + \left(R_s + R_s\frac{L_q}{L_d}\right)s + \left(\frac{R_s^2}{L_d} + \omega_r^2 L_{qs}\right)}$$ Equation 4

Figure 2C:
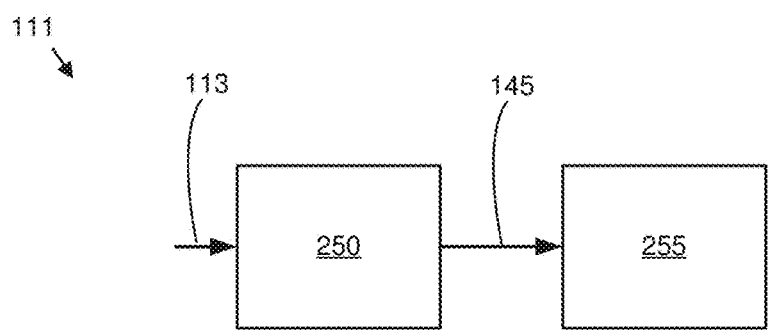
FIG. 2C is a schematic block diagram of a plant model according to an alternate embodiment.

FIG. 2C is a schematic block diagram of a plant model 111 of the permanent magnet machine 110. In the depicted embodiment, the plant model 111 includes the angular control portion 250 and the second-order q-axis current portion 255. Because the output voltage angle 113 effectively cancels the angular control portion 250 of the permanent magnet machine 110, the control signal M 145 can be generated to control only the second-order q-axis current 255 of the permanent magnet machine 110, greatly simplifying the transfer function for the control module 125 as will be described hereafter in FIGS. 3A-B.

Figure 3A:
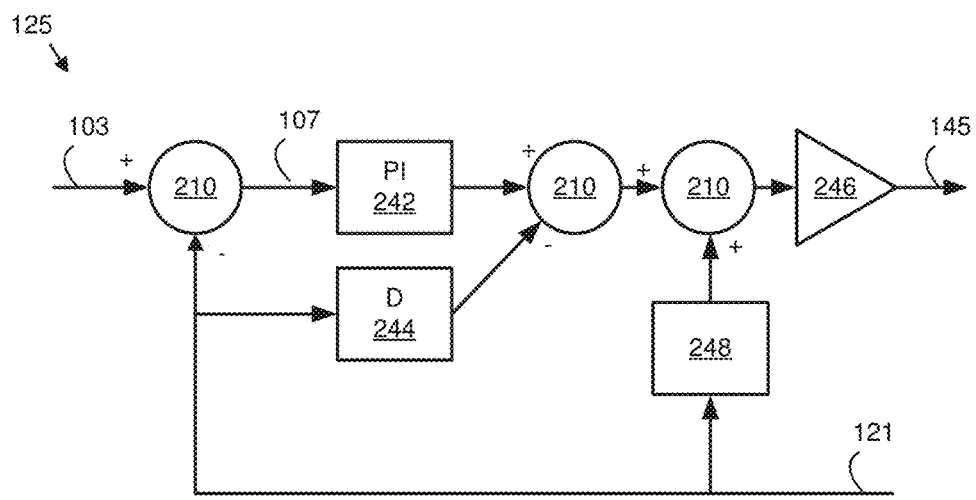
FIG. 3A is a schematic block diagram of a control module according to an embodiment.

FIG. 3A is a schematic block diagram of the control module 125. In the depicted embodiment, the control module 125 generates the control signal M 145 as the transfer function of a q-axis torque current signal 103 and a current feedback signal 121. The transfer function may be a proportional-integral-derivative transfer (PID) function. The control module 125 includes one or more summing functions 210, a proportional-integral control function 242, a derivative control function 244, a $$\omega_r^2 + \frac{R_s^2}{L_d L_q}$$

function 248, and a $L_q$ gain function 246. The control module 125 may implement the transfer function TF as illustrated in Equation 5, wherein the transfer function TF is a closed-loop transfer function, $k_p$ is a proportional gain for the proportional-integral control function 242, $k_d$ is a derivative gain for the derivative control function 244, and $k_i$ is an integral gain for the proportional-integral control function 242.

$$TF = \frac{k_p s + k_i}{s^3 + \left(R_s\left(\frac{1}{L_d} + \frac{1}{L_q}\right) + k_d\right)s^2 + k_p s + k_i}$$ Equation 5

In one embodiment, $k_p$, $k_d$, and $k_i$ are calculated using Equations 6-8.

$$k_p = 3\xi_2 \omega_n^2$$ Equation 6

$$k_d = 3\xi_1 \omega_n - R_s\left(\frac{1}{L_d} + \frac{1}{L_q}\right)$$ Equation 7

$$k_i = \omega_n^3$$ Equation 8

In one embodiment, if the converter 165 is operating in a six-step mode, the control module 125 implements the closed-loop transfer function TF as illustrated in Equation 9.

$$TF = \frac{\frac{k_p s + k_i}{1.5 T_{PWM}}}{s^4 + \left(a_1 + \frac{1}{1.5 T_{PWM}}\right)s^3 + \left(a_0 + \frac{(a_1 + k_d)}{1.5 T_{PWM}}\right)s^2 + \frac{k_p}{1.5 T_{PWM}}s + \frac{k_i}{1.5 T_{PWM}}}$$ Equation 9

If the converter 165 is operating in six-step mode, $k_p$, $k_d$, and $k_i$ may be calculated using Equations 10-12.

$$k_p = 1.5 T_{PWM} 4x_3 \omega_n^3$$ Equation 10

$$k_d = 1.5 T_{PWM} (6w_2 \omega_n^2 - a_0) - a_1$$ Equation 11

$$k_i = 1.5 T_{PWM} \omega_n^4$$ Equation 12

In one embodiment, $\omega_n$ is calculated as shown in Equation 13, $a_0$ is calculated as shown in Equation 14, $a_1$ is calculated as shown in Equation 15, and $x_1$, $x_2$, and $x_3$ are nonzero damping ratios.

$$\omega_n = \frac{1}{4x_1}\left(a_1 + \frac{1}{1.5 T_{PWN}}\right)$$ Equation 13

$$a_0 = \frac{R_s^2}{L_d L_q} + \omega_r^2$$ Equation 14

$$a_1 = \frac{R_s}{L_d} + \frac{R_s}{L_q}$$ Equation 15

Figure 3B:
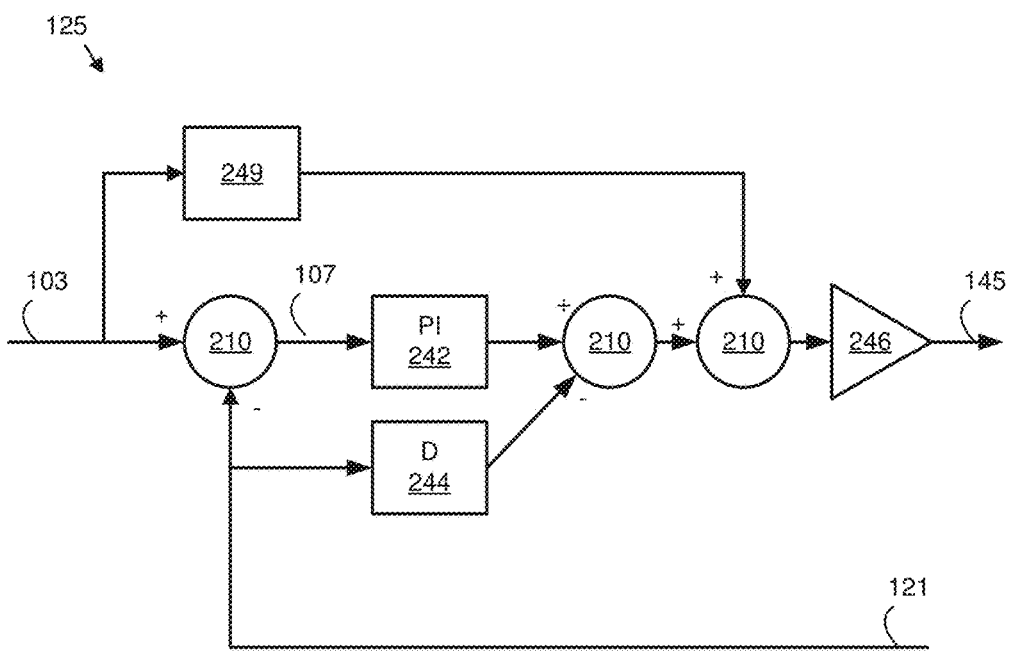
FIG. 3B is a schematic block diagram of a control module according to an alternate embodiment.

FIG. 3B is a schematic block diagram of an alternate embodiment of the control module 125. In the depicted embodiment, the control module 125 does not have the $$\omega_r^2 + \frac{R_s^2}{L_d L_q}$$

function 248. Instead, a $$\omega_r^2 + \frac{R_s^2}{L_d L_q}$$

feedforward function 249 is employed. In one embodiment, $k_p$ is calculated using Equation 16 for the control module 125 of FIG. 3B.

$$k_p = 1.5 T_{PWM} 4\omega_n^3 - a_0$$ Equation 16

Figure 4:
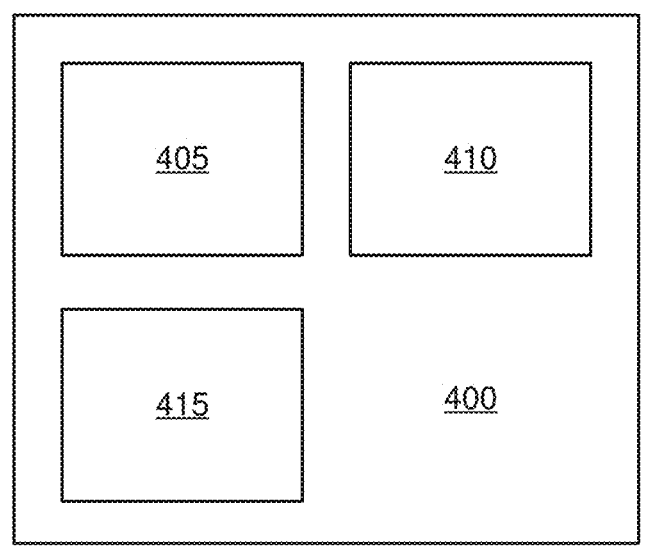
FIG. 4 is a schematic block diagram of a computer according to an embodiment.

FIG. 4 is a schematic block diagram of a computer 400. The computer 400 may be embodied in the controller 105. In a certain embodiment, the computer 410 includes the torque to Iq module 140 and/or the waveform generator 135. In addition, the computer 400 may comprise the control module 125, the canceling function 130, and one or more summing functions 210. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. In one embodiment, the processor 405 is a digital signal processor. The communication hardware 415 may communicate with other devices such as the waveform generator 135 and/or the torque to Iq module 140.

Figure 5:
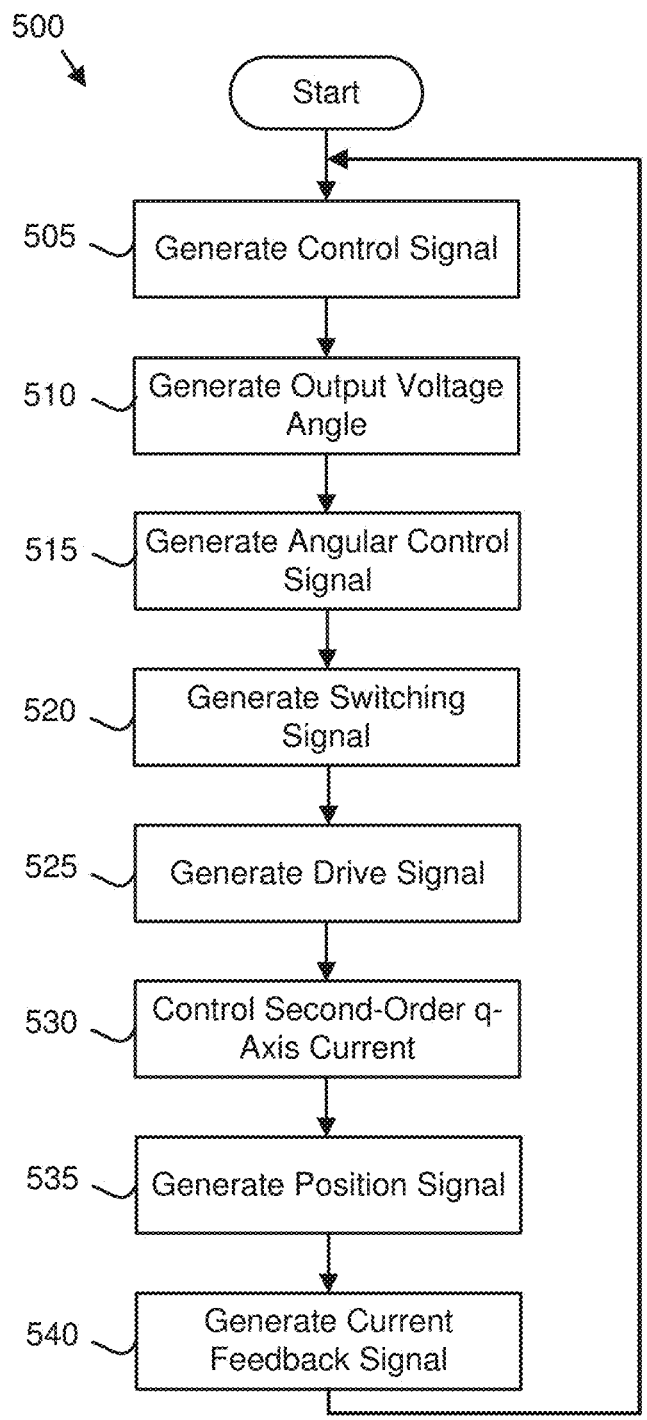
FIG. 5 is a schematic flow chart diagram of a flux vector control method according to an embodiment.

FIG. 5 is a schematic flow chart diagram of a flux vector control method 500. The method 500 may employ flux vector control to control the permanent magnet machine 110. The method 500 may be performed by the system 100 and/or the controller 105.

The method 500 starts, and in one embodiment, the control module 125 generates 505 the control signal M 145 for the permanent magnet machine 110. The controller 125 may generate 505 the control signal M 145 as a transfer function of the q-axis torque current signal 103 and the current feedback signal 121. The transfer function may be the transfer function of Equation 5. Alternatively, if the converter 165 operates in six-step mode, the transfer function may be the transfer function of Equation 9.

The canceling function 130 may generate 510 the output voltage angle 113. The output voltage angle 113 may be generated 510 as a function of the control signal M 145. In addition, the output voltage angle $\theta_v$ 113 may be generated 510 as the function of the control signal M 145, the rotor frequency $\omega_r$ 216, and the commanded output voltage magnitude 123 as illustrated in Equation 2.

The controller 105 may further generate 515 the angular control signal 115. In one embodiment, the angular control signal 115 is generated 515 as the output voltage angle 113 summed with the position signal 109.

The waveform generator 135 may generate 520 the switching signal 116 as a function of the angular control signal 115 and drive the converter 165 with the switching signal 116.

The converter 165 generates 525 the drive signals 127 that drives the permanent magnet motor 110. The drive signals 127 may be generated 525 as a function of the switching signal 116. The converter 165 and drive signals 127 may be powered by a drive bus (not shown). In addition, the converter 165 may generate 525 the commanded output voltage magnitude 123 that measures of a voltage of the drive bus.

Because the drive signals 127 are generated 525 based on the switching signal 116 and the angular control signal 115 that is based on the output voltage angle 113, the drive signals 127 include the angular canceling function. As a result, the angular control portion 250 of the permanent magnet machine 110 is canceled by the angular canceling function. The control signal M 145 thus controls 530 the permanent magnet machine 110 as the second-order quadrant-axis current 255

In one embodiment, the permanent magnet machine 110 generates 535 the position signal 109. The position signal 109 may be a position of a rotor of the permanent magnet machine 110. The position signal 109 may be measured by an encoder or the like. In addition, the DQ Transform 150 generates 540 the current feedback signal 121. The current feedback signal 121 may be generated 540 as a product of a Clarke transform and a Park transform of the drive signal 127. The method 500 may further loop to generate 505 the control signal M 145.

Figure 6A:
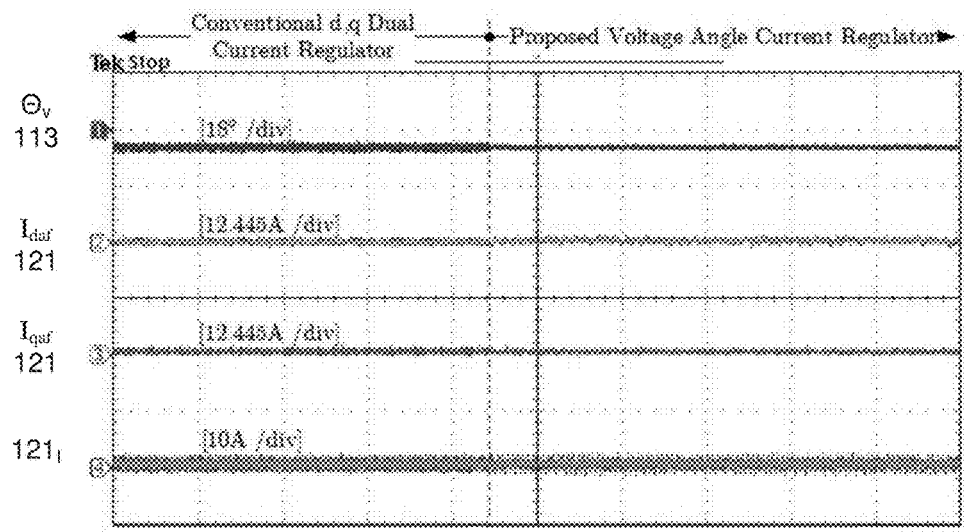
FIG. 6A is a graph comparing conventional current regulation and voltage angle current regulation according to an embodiment.

FIG. 6A is a graph comparing conventional current regulation and voltage angle current regulation in linear modulation region. In the depicted embodiment, the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for both conventional current regulation of the prior art and the voltage angle current regulation of the embodiments for a no-load transfer at 1270 rotations per minute (rpm). As shown, the embodiments operate smoothly at the unloaded condition and the transition is bumpless.

Figure 6B:
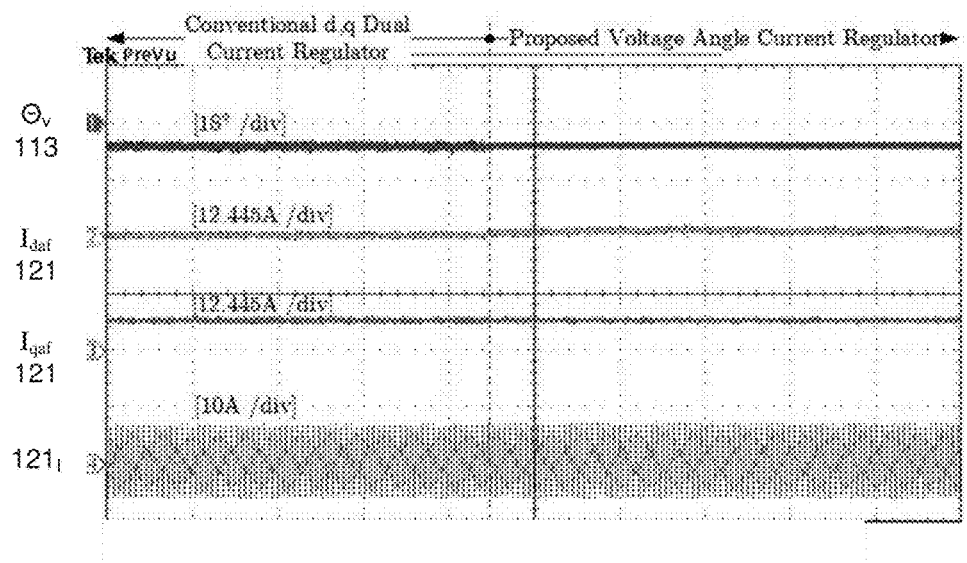
FIG. 6B is a graph comparing conventional current regulation and voltage angle current regulation according to an alternate embodiment.

FIG. 6B is a graph comparing conventional current regulation and voltage angle current regulation showing the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for both conventional current regulation of the prior art and the voltage angle current regulation of the embodiments for a 20% load transfer at 1170 rpm. As shown, the embodiments operate smoothly at 20% load conditions and the transition is bumpless.

Figure 6C:
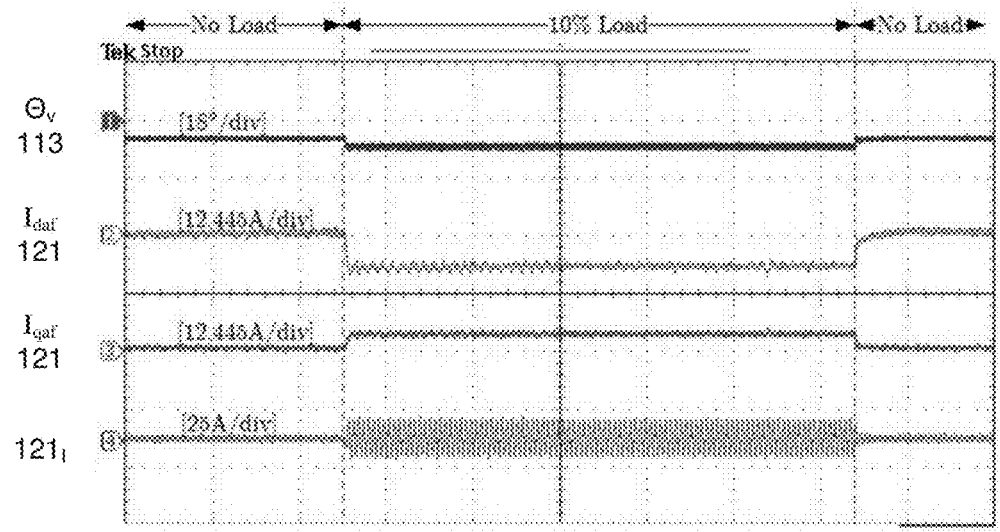
FIG. 6C is a graph showing voltage angle current regulation for step loads according to an embodiment.

FIG. 6C is a graph showing voltage angle current regulation for step loads. In the depicted embodiment, the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for a step transition from no-load to a 10% load and a step transition back to no-load at 1270 rpm.

Figure 6D:
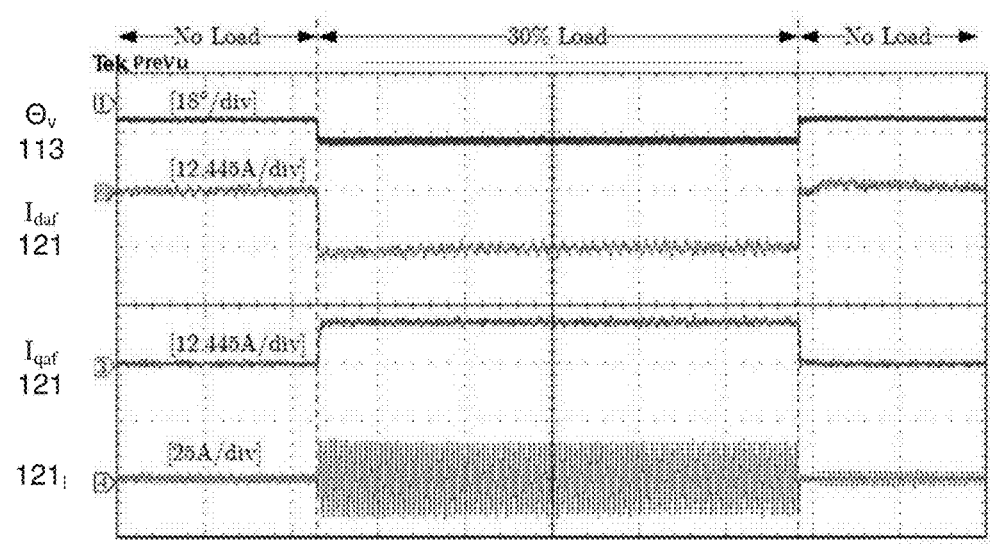
FIG. 6D is a graph showing voltage angle current regulation for step loads according to an alternate embodiment.

FIG. 6D is a graph showing voltage angle current regulation for step loads. In the depicted embodiment, the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for a step transition from no-load to a 30% load and a step transition back to no-load at 1270 rpm.

Figure 6E:
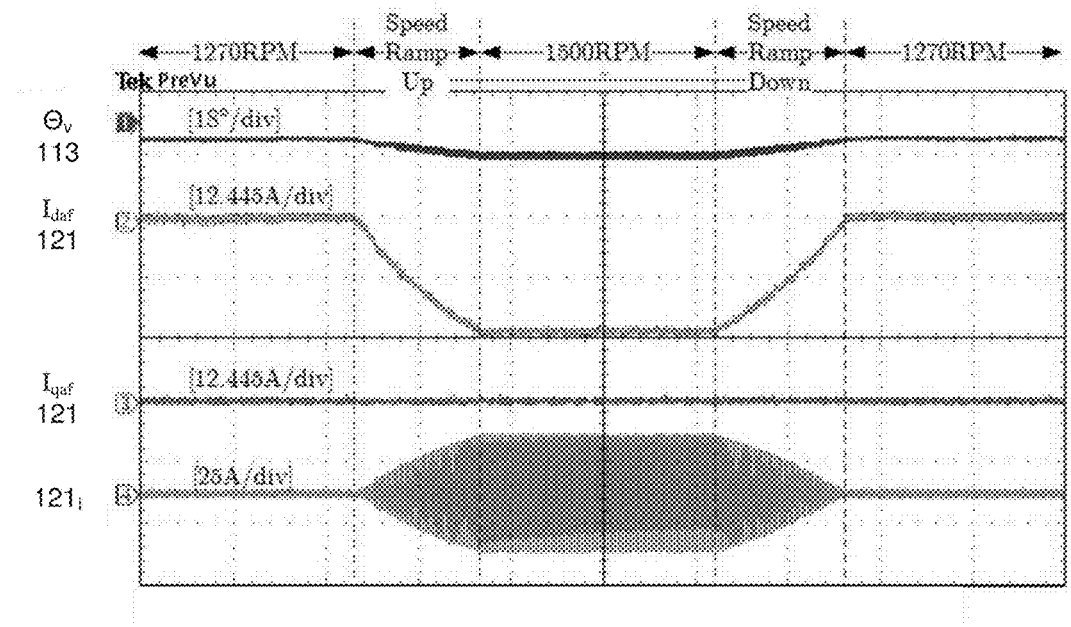
FIG. 6E is a graph illustrating speed control according to an embodiment.

FIG. 6E is a graph illustrating voltage angle current regulation speed control. In the depicted embodiment, the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for 1270 rpm, followed by a speed ramp-up to 1500 RPM, followed by a speed ramp down to 1270 rpm.

Figure 6F:
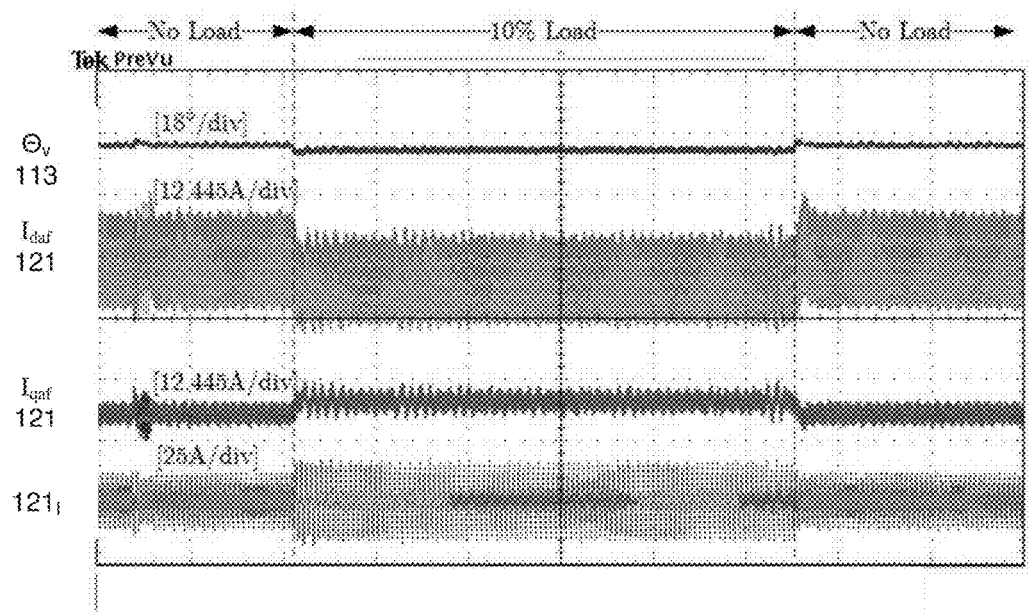
FIG. 6F is a graph showing voltage angle current regulation for step loads according to an embodiment.

FIG. 6F is a graph showing voltage angle current regulation for step loads for the converter 165 operating in six-step mode. In the depicted embodiment, the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for a step transition from no-load to a 10% load and a step transition back to no-load.

Figure 6G:
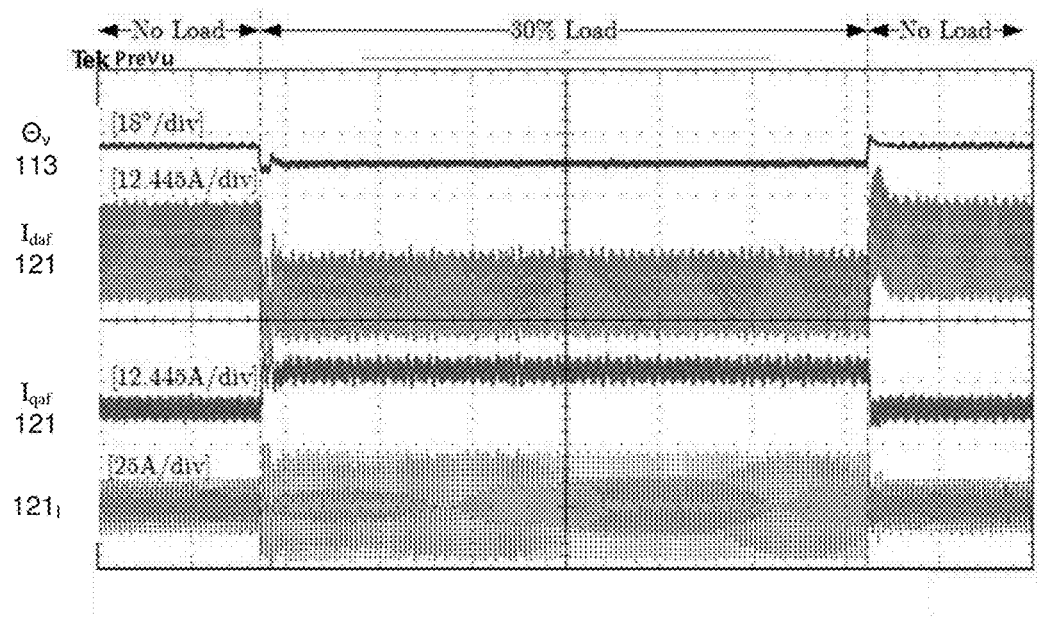
FIG. 6G is a graph showing voltage angle current regulation for step loads according to an alternate embodiment.

FIG. 6G is a graph showing voltage angle current regulation for step loads for the converter 165 operating in six-step mode. In the depicted embodiment, the output voltage angle 113, the d-axis feedback current $I_{daf}$ component of the current feedback signal 121, the q-axis feedback current $I_{qaf}$ component of the current feedback signal 121, and the drive signal phase current $127_I$ are shown for a step transition from no-load to a 30% load and a step transition back to no-load.

Problem/Solution

Permanent magnet machines 110 often need to deliver high torque at high-speeds. In addition, the permanent magnet machines 110 may need to operate at high efficiency, particularly when a battery is supplying the current for the permanent magnet machines 110. Unfortunately, d-q-axis current regulation has typically required that a minimum voltage margin be supported which reduces torque at high speeds as well as reducing efficiency. Flux angle control could increase the torque and the efficiency, but was often computationally intractable.

The embodiments employ the angular canceling function to cancel the angular control portion 250 of the dynamic response of the permanent magnet machine 110. As a result, the permanent magnet machine 110 may be controlled as the second-order quadrant-axis current 255, which greatly simplifies current control and allows the permanent magnet machine 110 to be operated at high torque for high speeds, as well as with high-efficiency.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller comprising:
a control module that generates a control signal M for a permanent magnet machine; and
a canceling function that generates an output voltage angle as a function of the control signal that regulates the permanent magnet machine, wherein the output voltage angle comprises an angular canceling function that cancels an angular control portion of a dynamic response of the permanent magnet machine such that the control signal controls the permanent magnet machine as a second-order quadrant-axis current,
wherein at least a portion of the canceling function and the control module comprise one or more of hardware and a processor executing code.

2. The controller of claim 1, wherein the output voltage angle is further generated as a function of the control signal, a rotor frequency, and a commanded output voltage magnitude.

3. The controller of claim 1, wherein the canceling function models the control signal M as $$M = -\omega_r |v_s| \cos\theta_v + \frac{R_s}{L_d} |v_s| \sin\theta_v + |v_s| \cos\theta_v \frac{d\theta_v}{dt} - \frac{R_s}{L_d} \omega_r \lambda_f,$$

wherein $\omega_r$ is a rotor frequency, $v_s$ is the output voltage, $\theta_v$ is the output voltage angle in synchronous reference frame, $R_s$ is a stator resistance, $L_d$ is a direct-axis stator inductance, and $\lambda_f$ is a permanent flux linkage.

4. The controller of claim 1, wherein the control signal is generated as a transfer function of a quadrant-axis torque current signal and a current feedback signal.

5. The controller of claim 4, wherein the transfer function is a proportional-integral-derivative transfer function.

6. The controller of claim 4, wherein the transfer function TF is a closed loop transfer function calculated as $$TF = \frac{k_p s + k_i}{s^3 + \left(R_s\left(\frac{1}{L_d} + \frac{1}{L_q}\right) + k_d\right)s^2 + k_p s + k_i},$$

where s is the frequency domain order, $R_s$ is motor stator resistance, $L_d$ is a direct-axis inductance, $L_q$ is a quadrant-axis inductance, $k_p$ is a proportional gain, $k_d$ is a derivative gain, and $k_i$ is an integral gain.

7. The controller of claim 6, wherein $k_p$ is calculated as $k_p = 3\xi_2 \omega_n^2$, $k_d$ is calculated as $$k_d = 3\xi_1 \omega_n - R_s\left(\frac{1}{L_d} + \frac{1}{L_q}\right),$$

and $k_i$ is calculated as $k_i = \omega_n^3$, where $\omega_n$ is a natural oscillation frequency.

8. The controller of claim 4, wherein a converter operating in six-step mode drives the permanent magnet machine with a drive signal and the transfer function TF is a closed loop transfer function calculated as $$TF = \frac{\frac{k_p s + k_i}{1.5 T_{PWM}}}{s^4 + \left(a_1 + \frac{1}{1.5 T_{PWM}}\right)s^3 + \left(a_0 + \frac{(a_1 + k_d)}{1.5 T_{PWM}}\right)s^2 + \frac{k_p}{1.5 T_{PWM}}s + \frac{k_i}{1.5 T_{PWM}}},$$

wherein $T_{PWM}$ is a pulse width modulation period for the drive signal.

9. The controller of claim 8, wherein $k_p$ is calculated as $k_p = 1.5 T_{PWM} 4x_3 \omega_n^3$, $k_d$ is calculated as $k_d = 1.5 T_{PWM}(6w_2\omega_n^2 - a_0) - a_1$, and $k_i$ is calculated as $k_i = 1.5 T_{PWM} \omega_n^4$, wherein $\omega_n$ is calculated as $$\omega_n = \frac{1}{4x_1}\left(a_1 + \frac{1}{1.5 T_{PWM}}\right), a_0 = \frac{R_s^2}{L_d L_q} + \omega_r^2, a_1 = \frac{R_s}{L_d} + \frac{R_s}{L_q}$$

and $x_1$, $x_2$, and $x_3$ are nonzero damping ratios.

10. The controller of claim 1, wherein a position signal from the permanent magnet machine and the output voltage angle are combined to generate an angular control signal.

11. The controller of claim 10, wherein a waveform generator drives a converter with a switching signal generated as a function of the angular control signal and the converter is connected to the permanent magnet motor.

12. A method comprising:
generating, by use of a processor, a control signal for a permanent magnet machine; and
generating with a canceling function an output voltage angle as a function of the control signal that regulates the permanent magnet machine, wherein the output voltage angle comprises an angular canceling function that cancels an angular control portion of a dynamic response of the permanent magnet machine such that the control signal controls the permanent magnet machine as a second-order quadrant-axis current.

13. The method of claim 12, wherein the output voltage angle is further generated as a function of the control signal, a rotor frequency, and a commanded output voltage magnitude.

14. The method of claim 12, wherein the canceling function models the control signal M as $$M = -\omega_r|v_s|\cos\theta_v + \frac{R_s}{L_d}|v_s|\sin\theta_v + |v_s|\cos\theta_v\frac{d\theta_v}{dt} - \frac{R_s}{L_d}\omega_r\lambda_f,$$

wherein $\omega_r$ is a rotor frequency, $v_s$ is the output voltage, $\theta_v$ is the output voltage angle in synchronous reference frame, $R_s$ is a stator resistance, $L_d$ is a direct-axis stator inductance, and $\lambda_f$ is a permanent flux linkage.

15. The method of claim 12, wherein the control signal is generated as a transfer function of a quadrant-axis torque current signal and a current feedback signal.

16. The method of claim 15, wherein the transfer function is a proportional-integral-derivative transfer function.

17. The method of claim 15, wherein the transfer function TF is a closed loop transfer function calculated as $$TF = \frac{k_p s + k_i}{s^3 + \left(R_s\left(\frac{1}{L_d} + \frac{1}{L_q}\right) + k_d\right)s^2 + k_p s + k_i},$$

where s is the frequency domain order, $R_s$ is motor stator resistance, $L_d$ is a direct-axis inductance, $L_q$ is a quadrant-axis inductance, $k_p$ is a proportional gain, $k_d$ is a derivative gain, and $k_i$ is an integral gain.

18. A system comprising:
a permanent magnet machine;
a control module that generates a control signal for the permanent magnet machine; and
a canceling function that generates an output voltage angle as a function of the control signal M that regulates the permanent magnet machine, wherein the output voltage angle comprises an angular canceling function that cancels an angular control portion of a dynamic response of the permanent magnet machine such that the control signal controls the permanent magnet machine as a second-order quadrant-axis current,
wherein at least a portion of the canceling function and the control module comprise one or more of hardware and a processor executing code.

19. The system of claim 18, wherein the output voltage angle is further generated as a function of the control signal, a rotor frequency, and a commanded output voltage magnitude.

20. The system of claim 18, wherein the canceling function 130 models the control signal as $$M = -\omega_r|v_s|\cos\theta_v + \frac{R_s}{L_d}|v_s|\sin\theta_v + |v_s|\cos\theta_v\frac{d\theta_v}{dt} - \frac{R_s}{L_d}\omega_r\lambda_f,$$

wherein $\omega_r$ is a rotor frequency, $v_s$ is the output voltage, $\theta_v$ is the output voltage angle in synchronous reference frame, $R_s$ is stator resistance, $L_d$ is direct-axis stator inductance, and $\lambda_f$ is permanent flux linkage.

* * * * *